United States Patent
Woulfe et al.

(10) Patent No.: US 10,698,680 B2
(45) Date of Patent: Jun. 30, 2020

(54) ENGINEERING SYSTEM ROBUSTNESS USING BUG DATA

(71) Applicant: MICROSOFT TECHNOLOGY LICENSING, LLC, Redmond, WA (US)

(72) Inventors: Muiris Woulfe, Dublin (IE); Poornima Muthukumar, Seattle, WA (US); Yuanyuan Dong, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/469,423

(22) Filed: Mar. 24, 2017

(65) Prior Publication Data
US 2018/0275970 A1 Sep. 27, 2018

(51) Int. Cl.
| | |
|---|---|
| *G06F 8/70* | (2018.01) |
| *G06F 11/36* | (2006.01) |
| *G06N 3/08* | (2006.01) |
| *G06F 8/60* | (2018.01) |
| *G06F 8/20* | (2018.01) |
| *G06N 3/04* | (2006.01) |

(52) U.S. Cl.
CPC .......... *G06F 8/70* (2013.01); *G06F 8/20* (2013.01); *G06F 8/60* (2013.01); *G06F 11/3668* (2013.01); *G06N 3/0445* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 7,672,811 B2 | 3/2010 | Xiao et al. | |
| 8,190,468 B1 | 5/2012 | Drew et al. | |
| 8,311,806 B2 | 11/2012 | Bonnet et al. | |
| 8,381,190 B2 | 2/2013 | John et al. | |
| 8,386,854 B2 | 2/2013 | Fernandess et al. | |
| 8,589,882 B2 | 11/2013 | Shochat et al. | |
| 8,750,489 B2 | 6/2014 | Park | |

(Continued)

FOREIGN PATENT DOCUMENTS

| | | |
|---|---|---|
| CN | 105446734 A | 3/2016 |
| WO | 2015065367 A1 | 5/2015 |

OTHER PUBLICATIONS

U.S. Appl. No. 15/362,744, Woulfe, et al., "Source Code Bug Prediction", filed Nov. 28, 2016.

(Continued)

*Primary Examiner* — Wynuel S Aquino
*Assistant Examiner* — Mark A Gooray
(74) *Attorney, Agent, or Firm* — Rainier Patents, P.S.

(57) ABSTRACT

Information concerning software bugs including bug detection, bug prediction data and/or historical bug data can be used to determine whether it is safe to commit, integrate, deploy and/or deliver a software change. If the change is deemed unsafe, the change can be rejected automatically. Alternatively, the change can proceed following approval by an administrator, supervisor, implementer, manager and/or other designated approval mechanism. Actions taken to override a block can be recorded along with information concerning failed deployments and/or deliveries, a higher than normal customer failure rate after deployment and/or delivery or through manual data entry.

20 Claims, 5 Drawing Sheets

(56) References Cited

U.S. PATENT DOCUMENTS

| | | | |
|---|---|---|---|
| 8,850,272 | B2 | 9/2014 | Pasala et al. |
| 8,924,938 | B2 | 12/2014 | Chang et al. |
| 9,043,759 | B1 | 5/2015 | Lininger |
| 9,183,123 | B2 | 11/2015 | Spektor et al. |
| 9,201,646 | B2 | 12/2015 | Balachandran |
| 9,244,510 | B1 | 1/2016 | Conrad et al. |
| 9,256,513 | B2 | 2/2016 | Chen |
| 9,305,279 | B1 | 4/2016 | Menzel |
| 9,378,015 | B2 | 6/2016 | Nagappan et al. |
| 9,389,984 | B2 | 7/2016 | Chockler et al. |
| 9,471,470 | B2 | 10/2016 | Prasad et al. |
| 9,639,353 | B1 | 5/2017 | Henriksen et al. |
| 9,733,933 | B1* | 8/2017 | Arquero .................. G06F 8/33 |
| 9,898,387 | B2 | 2/2018 | Rodmell |
| 10,175,979 | B1 | 1/2019 | Elwell et al. |
| 2003/0084063 | A1 | 5/2003 | Delmonaco et al. |
| 2004/0117761 | A1 | 6/2004 | Andrews et al. |
| 2006/0041864 | A1 | 2/2006 | Holloway et al. |
| 2006/0156286 | A1 | 7/2006 | Morgan et al. |
| 2007/0028219 | A1 | 2/2007 | Miller et al. |
| 2008/0228549 | A1 | 9/2008 | Harrison |
| 2009/0182757 | A1 | 7/2009 | Lotlikar et al. |
| 2009/0319995 | A1 | 12/2009 | Gawor et al. |
| 2010/0058294 | A1* | 3/2010 | Best ......................... G06F 8/71 |
| | | | 717/122 |
| 2011/0154109 | A1 | 6/2011 | Levine et al. |
| 2011/0314450 | A1 | 12/2011 | Shochat et al. |
| 2012/0204068 | A1 | 8/2012 | Ye et al. |
| 2013/0007700 | A1 | 1/2013 | Villar et al. |
| 2013/0014084 | A1 | 1/2013 | Sahibzada et al. |
| 2013/0311968 | A1 | 11/2013 | Sharma |
| 2014/0033174 | A1 | 1/2014 | Farchi et al. |
| 2014/0053135 | A1* | 2/2014 | Bird ...................... G06F 11/008 |
| | | | 717/124 |
| 2014/0079297 | A1 | 3/2014 | Tadayon et al. |
| 2014/0136277 | A1 | 5/2014 | Bassin et al. |
| 2014/0172514 | A1 | 6/2014 | Schumann et al. |
| 2015/0033202 | A1 | 1/2015 | Wilson et al. |
| 2015/0058826 | A1 | 2/2015 | Hu et al. |
| 2015/0067861 | A1* | 3/2015 | Foley .................... H04L 63/145 |
| | | | 726/24 |
| 2015/0082277 | A1 | 3/2015 | Champlin-Scharff et al. |
| 2015/0089481 | A1 | 3/2015 | Pasala et al. |
| 2015/0161030 | A1 | 6/2015 | Wu et al. |
| 2015/0269060 | A1 | 9/2015 | Rodmell |
| 2015/0363294 | A1* | 12/2015 | Carback, III ............. G06F 8/37 |
| | | | 717/132 |
| 2016/0042275 | A1 | 2/2016 | Dettman et al. |
| 2016/0274994 | A1 | 9/2016 | Nikam et al. |
| 2016/0378618 | A1 | 12/2016 | Cmielowski et al. |
| 2017/0060578 | A1 | 3/2017 | Shukla et al. |
| 2017/0075790 | A1* | 3/2017 | Macleod ............. G06F 11/3664 |
| 2017/0091078 | A1* | 3/2017 | Atyam ................ G06F 11/3616 |
| 2017/0147955 | A1 | 5/2017 | Ezry et al. |

OTHER PUBLICATIONS

U.S. Appl. No. 15/469,414, Woulfe, et al., "Bug Categorization and Team Boundary Inference Via Automated Bug Detection", filed Mar. 24, 2017.

U.S. Appl. No. 15/469,396, Woulfe, et al., Enhancing Software Development Using Bug Data, filed Mar. 24, 2017.

U.S. Appl. No. 15/469,431, Woulfe, et al., "Facilitating Organizational Management Using Bug Data", filed Mar. 24, 2017.

Maheedharan, Vimal, "Continuous Integration Testing Using Selenium", Published on: Dec. 28, 2016, 17 pages.

Bajwa, et al., "Unintentional bugs to vulnerability mapping in Android applications", In Proceedings of IEEE International Conference on Intelligence and Security Informatics, May 27, 2015, 2 pages.

Wang, et al., "Detect Related Bugs from Source Code Using Bug Information", In Proceedings of IEEE 34th Annual Computer Software and Applications Conference, Jul. 19, 2010, pp. 228-237.

"Definition of Risk Factor", Retrieved Date: Nov. 13, 2018, 1 Page.

"Non Final Office Action Issued in U.S. Appl. No. 15/469,396", dated Jun. 4, 2018, 16 Pages.

"Non Final Office Action Issued in U.S. Appl. No. 15/469,431", dated Apr. 9, 2018, 20 Pages.

Cook, et al., "Finding Bugs in Source Code Using Commonly Available Development Metadata", In Proceedings of the 8th Workshop on Cyber Security Experimentation and Test, Aug. 10, 2015, 8 Pages.

Gong, et al., "BugMap: A Topographic Map of Bugs", in Proceedings of the 9th Joint Meeting on Foundations of Software Engineering, Aug. 26, 2013, pp. 647-650.

Hardesty, Larry, "Recognizing Correct Code", Jan. 29, 2016, 3 Pages.

Khanduja, Jaideep, "How to Predict the Number of Bugs in the Next Code of a Programmer", Oct. 19, 2009, 6 Pages.

Kim, et al., "Classifying Software Changes: Clean or Buggy", In Journal of Transactions on Software Engineering, vol. 34, Issue 2, Mar. 31, 2008, pp. 1-41.

Kim, et al., "Memories of Bug Fixes", In Proceedings of the 14th ACM SIGSOFT International Symposium on Foundations of Software Engineering, Nov. 11, 2006, 11 Pages.

Lee, et al., "Micro Interaction Metrics for Defect Prediction", In Proceedings of the 19th ACM SIGSOFT symposium and the 13th European conference on Foundations of Software Engineering, Sep. 9, 2011, pp. 311-321.

Lewis, et al., "Bug Prediction at Google", Dec. 15, 2011, 15 Pages.

Madhavan, et al., "Predicting Buggy Changes Inside an Integrated Development Environment", In Proceedings of the OOPSLA Workshop on Eclipse Technology Exchange, Oct. 21, 2007, pp. 36-40.

Ostrand, et al., "Programmer-Based Fault Prediction", In Proceedings of the 6th International Conference on Predictive Models in Software Engineering, Sep. 13, 2010, pp. 1-10.

Zhang, et al., "Mining Individual Performance Indicators in Collaborative Development Using Software Repositories", In Proceedings of the 15th Asia-Pacific Software Engineering Conference, Dec. 5, 2008, pp. 247-254.

"Final Office Action Issued in U.S. Appl. No. 15/469,396", dated Nov. 1, 2018, 12 Pages.

"Final Office Action Issued in U.S. Appl. No. 15/469,431", dated Nov. 19, 2018, 24 Pages.

"Non Final Office Action Issued in U.S. Appl. No. 15/362,744", dated May 15, 2019, 24 Pages.

"Non Final Office Action Issued in U.S. Appl. No. 15/469,396", dated May 16, 2019, 15 Pages.

"Non Final Office Action Issued in U.S. Appl. No. 15/469,431", dated Aug. 9, 2019, 22 Pages.

Dommati, et al., "Bug Classification: Feature Extraction and Comparison of Event Model using Naive Bayes Approach", In Proceedings of International Conference on Recent Trends in Computer and Information Engineering, Apr. 13, 2012, pp. 8-12.

"Probability vs Confidence", 2016, 4 Pages.

"Final Office Action Issued in U.S. Appl. No. 15/362,744", dated Oct. 17, 2019, 25 Pages.

"Non-Final Office Action Issued in U.S. Appl. No. 15/469,414", dated Nov. 15, 2019, 28 Pages.

Annis, Charles, "Frequentists and Bayesians", 2014, 2 Pages.

Mani, et al., "AUSUM: Approach for Unsupervised Bug Report Summarization", In Proceedings of the ACM SIGSOFT 20th International Symposium on the Foundations of Software Engineering, Nov. 11, 2012, 11 Pages.

Meyniel, et al., "Confidence as Baysian Probability: from neural origins to behavior", In Neuron vol. 88, Issue 1, Oct. 7, 2015, pp. 78-92.

Strauss, et al., "Classical confidence intervals and Bayesian probability estimates for ends of local taxon ranges", Mathematical Geology, vol. 21, No. 4, May 1989, pp. 411-427.

* cited by examiner

FIG. 1a

Original Source Code File 152

```
1   public static class Fibonacci
2   {
3     public static int Fibonacci ( int n )
4     {
5       int [ ] fib = new int [n];
6       fib[0] = 0;
7       fib[1] = 1;
8       for (int i=2; i<= n; i++)
9       {
10        fib[i] = fib[i – 1];
11      }
12      return fib[n];
13    }
14  }
```

Modified Source Code File 154

```
1   public static class Fibonacci
2   {
3     public static int Fibonacci ( int n )
4     {
5       int [ ] fib = new int [n + 1];
6       fib[0] = 0;
7       fib[1] = 1;
8       for (int i=2; i<= n; i++)
9       {
10        fib[i] = fib[i – 1] + fib[i-2];
11      }
12      return fib[n];
13    }
14  }
```

Differential Code 156

```
    public static class Fibonacci
    {
      public static int Fibonacci ( int n )
      {
-       int[] fib = new int[n];
+       int [ ] fib = new int [n + 1];
        fib[0] = 0;
        fib[1] = 1;
        for (int i=2; i<= n; i++)
        {
-         fib[i] = fib[i – 1];
+         fib[i] = fib[i – 1] + fib[i-2];
        }
        return fib[n];
      }
    }
```

Annotated Code 158

```
FALSE   public static class Fibonacci
FALSE   {
FALSE     public static int Fibonacci ( int n )
FALSE     {
TRUE        int [ ] fib = new int [n];
FALSE       fib[0] = 0;
FALSE       fib[1] = 1;
FALSE       for (int i=2; i<= n; i++)
FALSE       {
FALSE         fib[i] = fib[i – 1];
FALSE       }
FALSE       return fib[n];
FALSE     }
FALSE   }
```

ENGINEERING SYSTEM ROBUSTNESS USING BUG DATA

CROSS-REFERENCE TO RELATED APPLICATIONS

The application is related in subject matter to co-pending U.S. patent application Ser. No. 15/469,396 entitled "ENHANCING SOFTWARE DEVELOPMENT USING BUG DATA", filed on Mar. 24, 2017. The application is related in subject matter to co-pending U.S. patent application Ser. No. 15/469,414 entitled "BUG CATEGORIZATION AND TEAM BOUNDARY INFERENCE VIA AUTOMATED BUG DETECTION", filed on Mar. 24, 2017. The application is related in subject matter to co-pending U.S. patent application Ser. No. 15/469,431 entitled "FACILITATING ORGANIZATIONAL MANAGEMENT USING BUG DATA", filed on Mar. 24, 2017. This application is related in subject matter to co-pending U.S. patent application Ser. No. 15/362,744 entitled "SOURCE CODE BUG PREDICTION" filed on Nov. 28, 2016.

BACKGROUND

Software development is now sometimes performed with continuous integration (CI) and/or continuous deployment/delivery (CD). Continuous integration and continuous deployment/delivery are considered best practices by many in the software development community and are gaining in popularity. A continuous integration system typically validates each submitted software change, typically by building, (i.e., converting source code into executable code) and running tests before delivering the software to customers.

A continuous deployment/delivery system typically performs a deployment or delivery to consumers of the software after the completion of each build.

SUMMARY

Information concerning software bugs including bug detection data, bug prediction data and/or historical bug data can be used to determine whether it is safe to commit, integrate and/or deploy or deliver a software change. If, based on one or more specified thresholds, the change is determined to be unsafe, the change can be rejected automatically. Alternatively, the change can proceed if overridden by approval by an administrator, supervisor, implementer, manager and/or other designated approval person or mechanism. Confirmation can be requested to confirm that the risks involved are understood.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Committing is the process of sending a change list from a local code location (e.g. a repository branch) to a shared code location (e.g., a repository). As used herein, a change list is a description of how a developer has changed source code locally from an earlier version stored in a software repository. A change list is the delta between the local code and the code in the repository. "Committing" a change list expresses a desire to make the changes permanent.

Integration refers to the process of combining the committed change list with the code in the shared code location. Continuous integration typically moves code through a series of repository branches. A continuous integration system automatically evaluates the advisability of integration of a software change or set of changes listed in a change list into a source code repository. A continuous integration system is designed to ensure that the change or set of changes are safe to integrate. It ensures that the integration can be made cleanly and unambiguously. More sophisticated systems may also run tests including but not limited to static code analysis, unit test execution, integration test execution and so on. If a failure occurs, integration will typically be cancelled and human intervention is needed to resolve the problem.

Deployment or delivery is the process of compiling or building the code into a format that can be released, and distributing the software. "Deployment" typically means software is delivered to servers. "Delivery" typically means delivery to any endpoint. The release can be to a server, as a software bundle for installation, etc. A continuous deployment or delivery system typically evaluates the code after integration, and is often responsible for automatically deploying and/or delivering software changes to production environments.

Traditionally, the potential for problems associated with committing, integrating and delivering changed software is assessed by testing. Testing can be performed after each commit. If the commit testing passes, an automated build is often performed that also includes testing. Then the software is deployed or delivered.

In accordance with aspects of the subject matter disclosed herein, the risk that software is buggy can be assessed before the software is committed, integrated and/or deployed or delivered. Different techniques can be used to extract features of source code with software bugs and features of source code that do not have software bugs. In accordance with some aspects of the subject matter disclosed herein, each element in a line of source code can be converted into a token that represents the element. The line of source code can be represented as a sequence of tokens. The sequence of tokens can be grouped into a window or group that includes sequences of tokens in an aggregated collection of contiguous source code statements. The sequences in a window can be transformed into a binary representation which forms a feature vector that can be used to train a machine learning model, such as a long short-term model (LSTM). LSTM is a recurrent neural network (RNN) architecture that is well-suited to learn from experience to classify process and predict time series when there are time lags of unknown size and bound between significant events.

In accordance with some aspects of the subject matter disclosed herein, a source code file can be partially tokenized with each line of source code including a combination of tokens and source code. Each line of source code can be analyzed on a character-by-character or chunk-by-chunk basis to identify characters or chunks that are associated with software bugs and characters or chunks that are not associated with software bugs. A chunk, as used herein, has a predetermined number of characters. Contiguous chunks of source code can be grouped into a window which can be converted into a binary representation that forms feature vectors that can be used to train a machine learning model, such as a recurrent neural network (RNN).

In accordance with some aspects of the subject matter disclosed herein, metrics representing a measurement of syntactical elements of a source code file can be collected. The metrics can include the number of variables, the number of mathematical operations, the number of a particular data type referenced, the number of loop constructs, the usage of a particular method, the usage of a particular data type and/or the complexity of the block of code such as, for example, computed by $O(n)$, $O(n^2)$, $O(n^3)$, etc. Computational complexity is a way of classifying computational problems according to their inherent difficulty. $O(n)$ means iteration over all n objects under consideration a single time as in, for example, a standard loop. $O(n^2)$ means iteration over all n objects for each iteration of the $O(n)$ loop. $O(n^3)$ means iteration over all n objects for each iteration of the $O(n^2)$ loop.

Metrics can be collected for each line of source code, for each method in a source code file, for each class in a source code file, and/or in other groupings. The metrics can be converted into a binary representation that forms feature vectors which can be used to train a machine learning model such as an artificial neural network (ANN). The metrics can be analyzed by a statistical analysis system.

The feature vectors can be constructed from source code files having software bugs and source code files with no software bugs. The feature vectors can be converted into data used to train and test a machine learning model. The feature vectors can be split into a group that is used to train a machine learning model and a group that is used to test the machine learning model. The model can be used to assess the probability or risk of the presence of software bugs in a source code file. The model can be used to determine the risk of a code change or a set of code changes in a change list including bugs. The model can be used to determine whether an integration and/or deployment or delivery should be performed based on bug data. In accordance with some aspects of the subject matter described herein, a threshold can be defined such that if a determined risk factor based on the bug data exceeds the threshold, integration and/or deployment or delivery is blocked. Other ways of threshold comparison processing are contemplated. The risk factor for a change list can be used to determine to block or allow integration, deployment and/or delivery of the change list.

The risk result for a set of changes (e.g., a change list, a block of code such as a file, class, method, etc.) can be based on the risk factor assigned to each individual element. The risk factor can be calculated using any desired mathematical formula appropriate for the context (such as but not limited to mean, average or summation). One appropriate formula can be a computation of the mean risk factor over all the lines in the change list added to the maximum per-line risk factor. This formula finds the average risk over the given change list, while adding the maximum to account for an exceptionally large maximum risk that could add serious risk to the change list not considered via the mean alone. The risk factor for the set of changes can be applied to determine if a set of changes will be committed to a software repository.

Thresholds, the determination to block or allow committing, integrating, deploying or delivering changes to software can be made via settings. The decision to block at integration or at deployment or delivery, etc., can be made via settings. Thresholds can be hard-coded into the continuous integration, continuous deployment, continuous delivery, machine learning and/or statistical analysis system. Thresholds can be set by an administrator, supervisor, manager, implementer and/or other approval person for the continuous integration, continuous deployment, continuous delivery, machine learning and/or statistical analysis system.

In accordance with aspects of the subject matter disclosed herein, committing, integrating and/or deploying or delivering software can be performed if the level of unit test (and/or other test) coverage for the identified bugs is sufficiently high. High test coverage can indicate that the code was checked sufficiently, decreasing risk. The degree of test coverage can contribute to a risk determination. The degree of test coverage can override a block.

In accordance with aspects of the subject matter disclosed herein, a block can be overridden by an administrator, manager, supervisor, implementer and/or other approval person or mechanism. Actions taken to override a block can be recorded along with information concerning failed deployments or deliveries, a higher than normal customer failure rate after deployment or delivery or through manual data entry. If a particular individual overrides a block and the override results in adverse results, that individual may be prevented from overriding a block in the future. If a particular individual overrides a block repeatedly and the override results in adverse results that exceed an established threshold, that individual may be prevented from overriding a block in the future. If a particular individual overrides a block and the override results in adverse results, that individual may be prevented from overriding a block in the future without obtaining approval from an administrator, supervisor, manager, implementer and/or other approval person or mechanism. The recorded data can be used to prohibit future overriding of the block by the overriding individual.

If the risk associated with a change list falls above a first specified threshold but below a second specified threshold, in accordance with some aspects of the subject matter described herein, the change list can be integrated and deployed and/or delivered only to test environments (including but not limited to internal slots, small production slices, etc.). In response to determining that code quality metrics are sufficiently high (through successful deployment or delivery, low user error rate, etc.) or following manual intervention, a change list associated with a risk that exceeds a specified threshold can be rolled out to all the production slots. The amount of time between deployment or delivery to test environments and deployment or delivery to all production environments can increase in relationship to the risk of the software changes in the change list. The number of users using the software changes in the change list can also be a factor in the determination, to ensure the changes have been adequately tested, thus preventing a change being tested for a period of low usage (e.g., 8 hours during the middle of the night) from being released despite little actual testing.

It will be appreciated that although described in the context of software bugs, the subject matter disclosed herein is not so limited. A set of hardware changes made by the developer or group of developers can be identified using a hardware description language. A risk factor for hardware changes specified by the developer or group of developers can be based on the risk factor assigned to each hardware component specified by the developer or group of developers. A risk factor for hardware changes can be computed using a hardware description language.

Improving Engineering System Robustness Using Bug Data

Figure 1A:
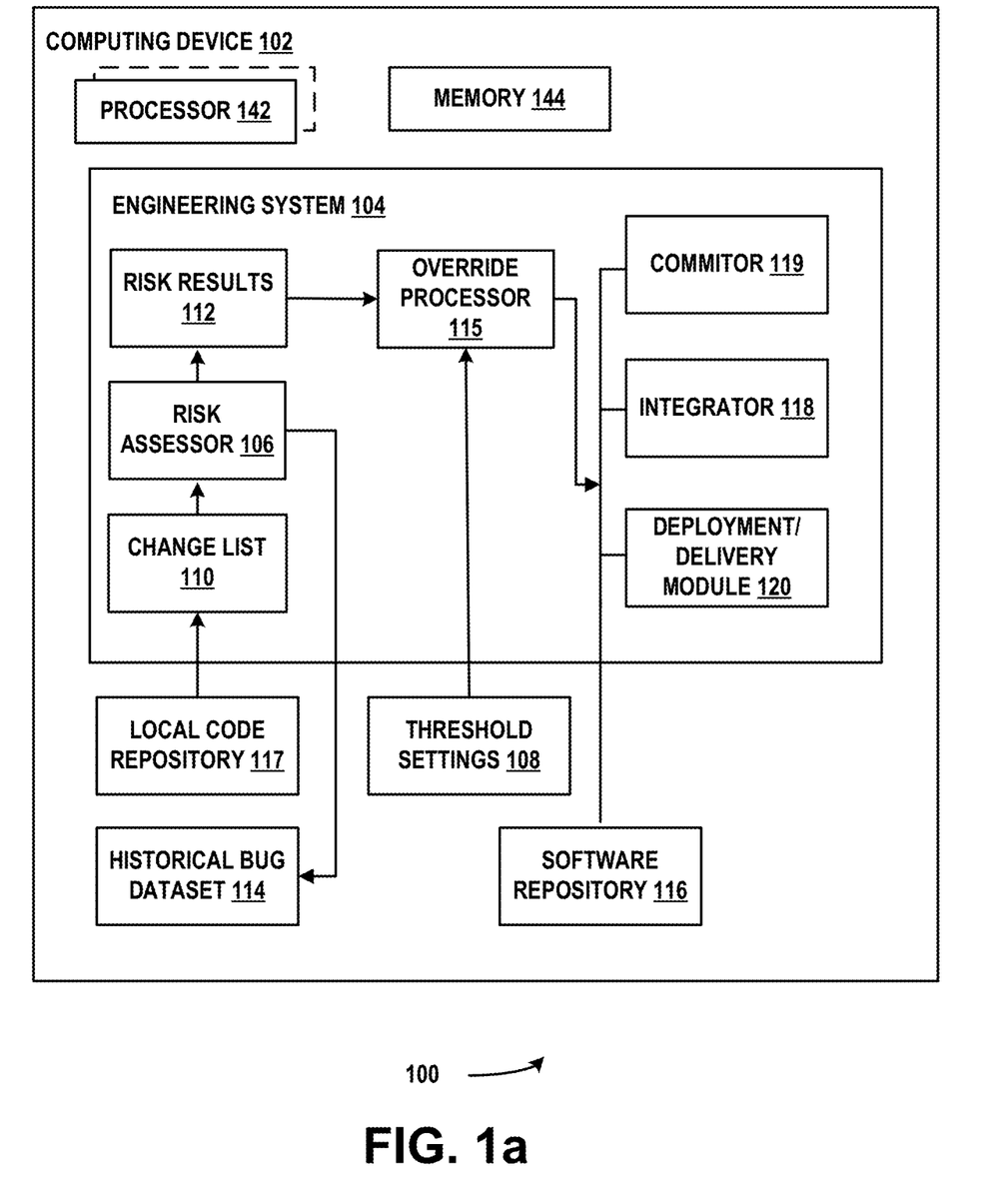
FIG. 1a is a block diagram illustrating an example of a system 100 for improving engineering system robustness using bug data in accordance with aspects of the subject matter disclosed herein.

FIG. 1a is a block diagram illustrating an example of a system for using bug data to improve the robustness of a software system in accordance with aspects of the subject matter disclosed herein. All or portions of system 100 may reside on one or more computers or computing devices such as the computers described below with respect to FIG. 3. System 100 or portions thereof may be provided as a stand-alone system or as a plug-in or add-in. System 100 may operate wholly or partially within an integrated development environment (IDE) or can execute wholly or partially outside an IDE. An IDE can be an IDE such as described with respect to FIG. 4 or can be any other IDE or development environment.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud. System 100 can be an on-premises system.

System 100 can include one or more computing devices. Contemplated computing devices include but are not limited to desktop computers, tablet computers, laptop computers, notebook computers, personal digital assistants, smart phones, cellular telephones, mobile telephones, sensors, server computers, client computers and so on. A computing device such as computing device 102 can include one or more processors such as processor 142, etc., and a memory such as memory 144 that communicates with the one or more processors.

System 100 may include an engineering system 104 comprising one or more program modules that when loaded into the memory and accessed by the one or more processors cause the processor to perform the action or actions attributed to the one or more program modules. The processor(s) may be configured to perform the action or actions attributed to the one or more program modules. System 100 may include any one of or any combination of any number of the following: a risk assessing module or risk assessor such as risk assessor 106, a module that performs override processing such as override processor 115, a module that commits software changes to a software repository such as commitor 119, a module that integrates software changes into a software repository such as integrator 118, and/or a module that deploys and/or delivers software changes such as deployment/delivery module 120.

A software repository such as software repository 116 can store program code. The software repository can be a version control system such as Apache Subversion or GIT. However, the subject matter disclosed herein is not limited to a source code repository and other sources including source code may be utilized as well. For example, without limitation, source code files belonging to a particular project in an integrated development environment (IDE), source code files associated with a particular storage location (e.g., directory/folder, cloud storage, etc.) can be searched. It is to be understood that wherever the term "repository" is used, any of the possible sources can be employed.

A developer can check program code out of a local code repository such as local code repository 117. A local code repository can be a repository branch. The developer can make changes to the checked out software. The changes made to the software can be kept in a change list such as change list 110. The change list 110 can be a description of how a developer has changed source code locally from an earlier version. A change list is the delta between the local code (e.g., on the developer's computer) and the code in the local code repository 117. "Committing" a change list expresses a desire to make the changes permanent.

When the code in the change list 110 is to be committed, the change list 110 can be sent to a risk assessor such as risk assessor 106. The change list 110 can be received by the risk assessor 106. The risk assessor 106 can determine the risk that the change list 110 includes bugs. Risk can be expressed as a percentage or the like, indicating for example, that there is a 42% risk that the software in the change list includes a bug. Risk can be determined using bug data stored in a historical bug dataset such as historical bug dataset 114. Bug data can include any combination of: bug detection data, historical bug data and/or bug prediction data. Bug detection is the process of detecting bugs. Bug detection can involve manual detection. Bug detection can involve an automated process. An automated process can identify buggy code. Historical bug data is data concerning what caused bugs in the past.

Bug prediction is the use of a machine learning and/or statistical analysis system to analyze characteristics of the code to predict the presence or absence of bugs. The subject matter disclosed herein can utilize different techniques for extracting features of source code with software bugs and features of source code that do not have software bugs. In accordance with some aspects of the subject matter disclosed herein, each element in a line of source code can be converted into a token that represents the element. The line of source code can be represented as a sequence of tokens. The sequence of tokens can be grouped into a window or group that includes sequences of tokens in an aggregated collection of contiguous source code statements. The sequences in a window can be transformed into a binary representation which forms a feature vector that trains a machine learning model, such as a long short-term model (LSTM). Long short-term memory (LSTM) is a recurrent neural network (RNN) architecture that is well-suited to learn from experience to classify, process and predict time series when there are time lags of unknown size and bound between significant events.

In accordance with other aspects of the subject matter disclosed herein, a source code file can be partially tokenized with each line of source code including a combination of tokens and source code. Each line of source code can be analyzed on a character-by-character or chunk-by-chunk basis to identify characters or chunks that are associated with and are not associated with software bugs. A chunk, as used herein, has a predetermined number of characters. Contiguous chunks of source code can be grouped into a window which can be converted into a binary representation that forms feature vectors that train a machine learning model, such as a recurrent neural network (RNN).

In accordance with other aspects of the subject matter disclosed herein, metrics representing a measurement of syntactical elements of a source code file can be collected. The metrics can include the number of variables, the number of mathematical operations, the number of a particular data type referenced, the number of loop constructs, the usage of a particular method, the usage of a particular data type and/or the complexity of the block of code like $O(n)$, $O(n^2)$, $O(n^3)$, etc. Computational complexity is a way of classifying computational problems according to their inherent difficulty. $O(n)$ means iteration over all n objects under consideration a single time as in, for example, a standard loop. $O(n^2)$ means iteration over all n objects for each iteration of the $O(n)$ loop. $O(n^3)$ means iteration over all n objects for each iteration of the $O(n^2)$ loop.

Metrics can be collected for each line of source code, for each method in a source code file, for each class in a source code file, and/or in other groupings. The metrics can be converted into a binary representation that forms feature vectors which can be used to train a machine learning model such as an artificial neural network (ANN).

The feature vectors can be constructed from source code files having a software bug and source code files without a software bug. The feature vectors can be split into data that is used to train the machine learning model and data that is used to test the machine learning model. The model can be used to predict the probability of the presence of a software bug in a source code file.

A risk assessor such as risk assessor 106 can receive buggy and bug free code from historical bug data such as historical bug dataset 117 and can calculate a risk factor. The calculated risk factor can be a measure of the likelihood that the software in the change list 110 is buggy (i.e., includes bugs).

The risk factor for a developer's code including bugs can be calculated using a mathematical formula such as but not limited to an average, mean or summation. The risk factor for a specified developer can be determined by combining the risk factor of each line of code the developer has written. Risk factors can be combined into risk results 112. Risk results 112 can be provided, for example, as a percentage or the like.

Risk results 112 can be accessed by an override processor such as override processor 115. Override processor 115 can receive threshold settings such as threshold settings 108. In accordance with some aspects of the subject matter described herein, a threshold can be defined such that if a determined risk factor or risk result based on the bug data exceeds the threshold, integration and/or deployment or delivery is blocked. The risk factor or risk result for a change list can be used to determine to block or allow integration, deployment and/or delivery.

Threshold settings 108 can include but are not limited to thresholds which determine blocking or allowing committing, integrating, deploying or delivering changes to software. Threshold settings can an include a setting which determines whether to block at integration or at deployment or delivery, etc. Threshold settings 108 can include a level of unit test or other testing sufficient to override a block. Thresholds can be hard-coded into the continuous integration, continuous deployment, continuous delivery, machine learning and/or statistical analysis system. Thresholds can be set by an administrator, supervisor, manager, implementer and/or other approval person for the continuous integration, continuous deployment, continuous delivery, machine learning and/or statistical analysis system.

In accordance with aspects of the subject matter disclosed herein, committing, integrating and/or deploying or delivering software can be performed if the level of unit test (and/or other test) coverage for the identified bugs is sufficiently high. High test coverage can indicate that the code was checked sufficiently, decreasing risk. The degree of test coverage can contribute to a risk determination or assessment.

In accordance with aspects of the subject matter disclosed herein, override processor 115 can enable an administrator, manager, supervisor, implementer and/or other approval person or mechanism to override a block. Actions taken to override a block can be recorded along with information concerning failed deployments or deliveries, a higher than normal customer failure rate after deployment or delivery or through manual data entry. If a particular individual overrides a block and the override results in adverse results, that individual may be prevented from overriding a block in the future. If a particular individual overrides a block repeatedly and the override results in adverse results that exceed an established threshold, that individual may be prevented from overriding a block in the future. If a particular individual overrides a block and the override results in adverse results, that individual may be prevented from overriding a block in the future without obtaining approval from an administrator, supervisor, manager, implementer and/or other approval person or mechanism. The recorded data can be used to prohibit future overriding of the block by the overriding individual.

If the risk factor or risk result associated with a change list falls above a first specified threshold but below a second specified threshold, in accordance with some aspects of the subject matter described herein, the change list can be integrated and deployed and/or delivered only to test environments (including but not limited to internal slots, small production slices, etc.). In response to determining that code quality metrics are sufficiently high (through successful deployment or delivery, low user error rate, etc.) or following manual intervention, a change list associated with a risk factor or risk result that exceeds a specified threshold can be rolled out to all the production slots. The amount of time between deployment or delivery to test environments and deployment or delivery to all production environments can increase in relationship to the degree of risk of the software changes in the change list. The number of users using the software changes in the change list can also be a factor in the determination, to ensure the changes have been adequately tested, thus preventing a change being tested for a period of low usage (e.g., 8 hours during the middle of the night) from being released despite little actual testing.

Figure 1B:
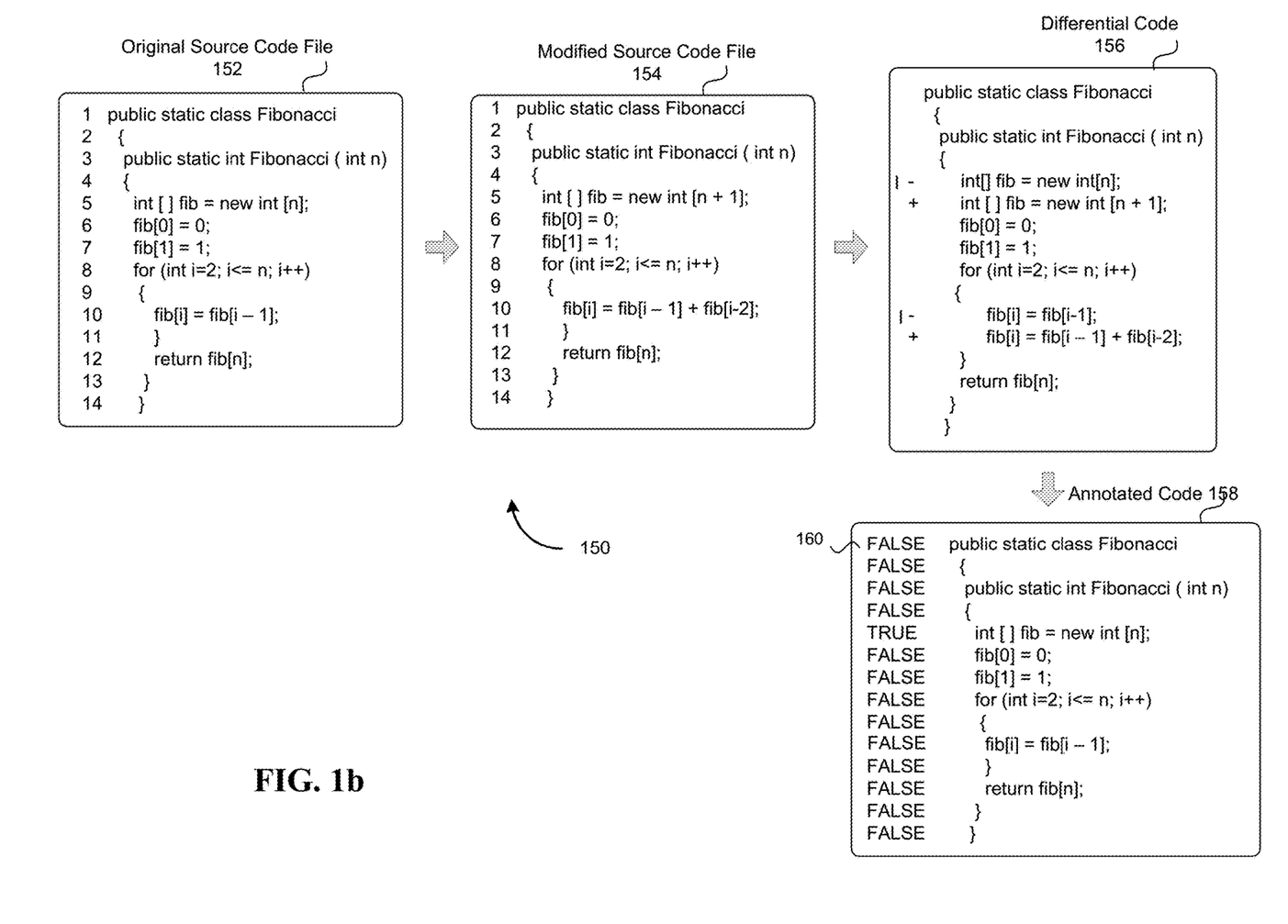
FIG. 1b is an example of an internal representation of historical bug data in accordance with aspects of the subject matter disclosed herein.

FIG. 1b illustrates an example of an internal representation 150 of historical bug data stored in historical bug dataset 114. In FIG. 1b, a portion of an original source code file 152 written in C# having 14 lines of code or source code statements is illustrated. For the purposes of this example, a source code statement is identified as being a continuous sequence of code elements that ends at a semicolon. This original source code file 152 can be stored in a source code repository or local code repository. The original source code file 154 shows a modified version of the original source code file 152 which corrects two software bugs at lines 5 and 10.

Differential code 156 illustrates the differences between the original source code file 152 and the modified source code file 154 where the source code statement "int[ ] fib=new int[n]" is annotated with the "-" symbol indicating that the associated code statement was altered. In addition, program 156 shows the source code statement "int [ ] fib=new int [n+1]" annotated with a "+" symbol indicating that the associated code statement is the modification. The tracked changes of a source code file (i.e., change sets) can be annotated with a flag that indicates whether or not each source code statement includes a bug. This can be done manually, programmatically (e.g., using a bug tracker) or by a machine learning and/or statistical analysis system. For example, the annotated code 158 represents the original source code file 152 annotated with a flag such as flag 160 at each line, where the flag "FALSE" denotes that there is no bug in a source code statement, the flag "TRUE" denotes a software bug is in the source code statement.

Override processor 115 can direct committor 199 to commit the change list to a software repository 116. Override processor 115 can direct integrator 118 to integrate the change list to a software repository 116. Override processor 115 can direct deployment/delivery module 120 to deploy the change list.

Figure 2:
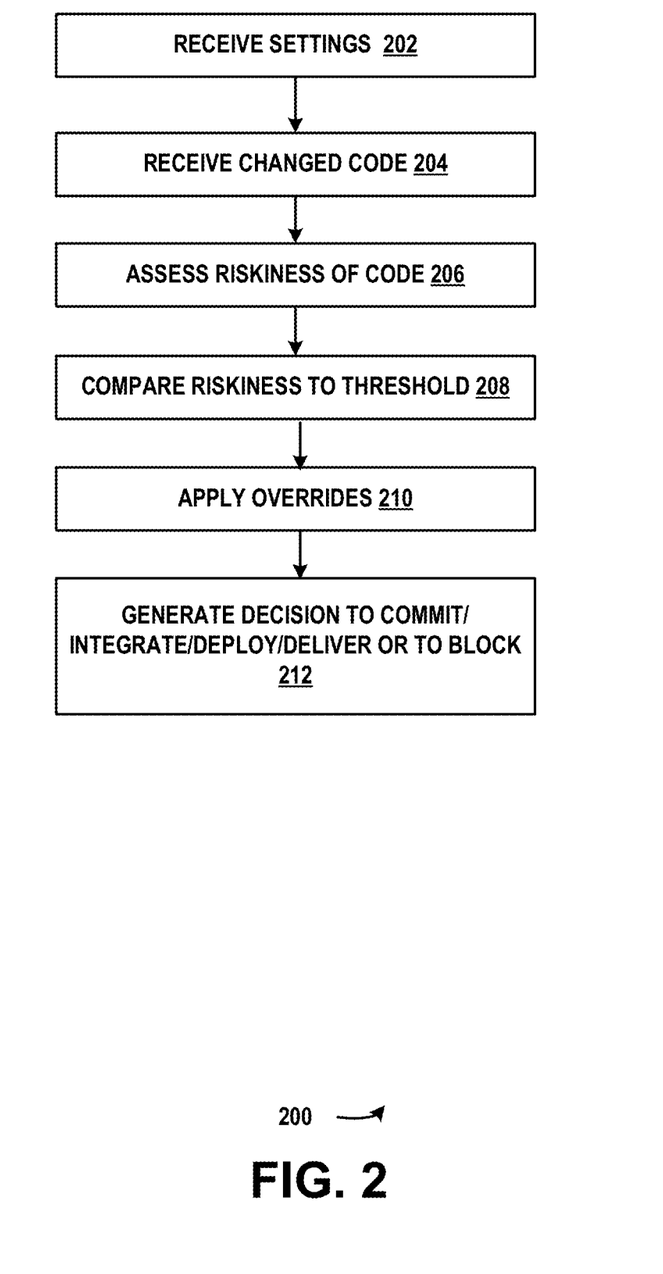
FIG. 2 is a flow diagram of an example of a method 200 for improving engineering system robustness using bug data in accordance with aspects of the subject matter disclosed herein.

FIG. 2 is a flow diagram of an example of a method for improving engineering system robustness in accordance with aspects of the subject matter disclosed herein. The method described in FIG. 2 can be practiced by a system such as but not limited to the one described with respect to FIG. 1*a*. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed. In some instances, not all operations performed are illustrated.

At operation 202 threshold settings for a system for improving robustness using bug data can be received, as described above. The threshold setting can be received, defined or computed such that if a determined risk factor or risk result based on bug data exceeds the threshold, actions including but not limited to committing software changes, integrating software changes, deploying software changes and/or delivering software changes are blocked. The threshold may apply to a risk factor or result for a change list. Bug data can be bug detection data, bug prediction data and/or historical information concerning software bugs.

The thresholds, the determination to block or allow and the decision as to whether to block at integration, deployment and/or delivery can be made via settings. In some cases, it may be preferable to set the setting for whether or not to block at integration, deployment and/or delivery to "block at deployment and/or delivery" because false positives may occur and blocking integration because of false positives may result in an undesirable deterioration of developer productivity.

The threshold can be uniquely set for each user. The value can be independently set by the administrators, supervisors, managers and/or others. Alternatively, the system can choose a value for the user threshold based on attributes including but not limited to how many bugs the user introduced previously, the user's rank/level within the organization and the duration for which the user worked for the organization and/or team.

At operation 204 changed software code can be received. Changed software can be a group of software changes listed in a change list, as described more fully above.

At operation 206 a risk assessment of the changed code can take place. The risk factor for a software change can be based on bug detection, bug prediction data and/or historical bug data. The risk factor may indicate the probability of the software change or set of changes including bugs. The risk factor can be provided to a user. The risk factor for the set of changes can be used to determine which change was most likely to have resulted in a bug. Automatic notifications can be generated (via, for example, toast notifications, dialog boxes, confirmation prompts, email, social network posts, instant messages, SMS messages or telephone calls) of potentially risky changes.

The risk result for a set of changes (or other block of code such as a file, class, method, etc.) can be based on the risk factor assigned to each individual element of the set. A risk factor can be calculated using any desired mathematical formula appropriate for the given context (such as but not limited to mean average or summation). A risk result can be similarly calculated in accordance with a formula.

At operation 208 the risk factor or risk result for the software change or set of changes can be compared to the risk threshold to determine if the software change or set of changes will be committed to a software repository, if the software change or set of changes will be integrated and/or to determine if the software change or set of changes will be deployed and/or delivered.

At operation 210 overrides can be applied. For example, in accordance with aspects of the subject matter disclosed herein, integration, deployment and/or delivery can be performed if the level of unit test (and/or other test) coverage is sufficiently high for the identified bugs. High test coverage can indicate that the code was checked sufficiently, decreasing risk. Alternatively, the degree of test coverage can contribute to a risk determination with, for example, negative risk factors applied for the addition of tests covering risky code.

In accordance with aspects of the subject matter disclosed herein, a block can be overridden by an administrator, manager and/or other approval mechanism. This feature may be advantageous because it may not be possible to correct all false positives. In accordance with some aspects of the subject matter disclosed herein, a confirmation that risks are understood can override a blockage. Guidelines such as ensuring that the detected bug(s) are false positives can be provided.

Actions taken to override a block can be recorded along with information concerning failed deployments, a higher than normal customer failure rate after deployment or through manual data entry. The recorded data can be used to prevent overriding a block if a particular individual overrides a block and the override results in adverse results, that individual may be prevented from overriding a block in the future. If a particular individual overrides a block repeatedly and the override results in adverse results that exceed an established threshold, that individual may be prevented from overriding a block in the future. If a particular individual overrides a block and the override results in adverse results, that individual may be prevented from overriding a block in the future without obtaining approval from an administrator, supervisor, manager and/or other individual.

Confirmation of understanding the risks may be requested before the code is committed. At operation 212 a decision to commit, integrate, deploy and/or deliver can be made. Results can be provided to software that commits the changes, integrates the changes and/or deploys or delivers the changes.

Conclusion

Described herein is a system, comprising a memory and a processor connected to the memory, where the processor is configured to receive a threshold setting, receive a software change, assess a risk factor of the software change based on bug data; and compare the risk factor of the software change to the threshold setting. In response to determining that the risk factor of the software change exceeds the threshold setting, a commit of the software change can be blocked. In response to determining that the risk factor of the software change exceeds the threshold setting, an integration of the software change can be blocked. In response to determining that the risk factor of the software change exceeds the threshold setting, a delivery of the software change can be blocked. In response to determining that the risk factor of the software change does not exceed the threshold setting, a commit of the software change can be performed. In response to determining that the risk factor of the software change does not exceed the threshold setting, an integration of the software change can be performed. In response to determining that the risk factor of the software change does not exceed the threshold setting, a delivery of the software change can be performed. The block can be overridden.

Described herein is a method in which a processor receives a threshold setting, a software change and assesses a risk factor for the software change, the risk factor comprising a risk that the software changes include bugs. The risk factor of the software change can be compared with the threshold setting. In response to determining that the risk factor exceeds the threshold setting, committing, integration, deployment and/or delivery of the software changes is blocked. The block can be overridden. The block can be overridden by an approval mechanism. Overriding can be based on acknowledgement of risk. A decision can be made to proceed with integration, deployment, delivery and/or committing.

Described herein is a device with a memory and a processor connected to the memory. The processor can be configured to determine a risk factor for software changes and based on the risk factor for the software changes, generate a decision to block application of the software changes. The decision can be overridden. Application of the software changes can be committing the software changes to a software repository, integrating the software changes into a software repository and/or delivering the software changes to an endpoint(s).

Exemplary Operating Environment

Figure 3:
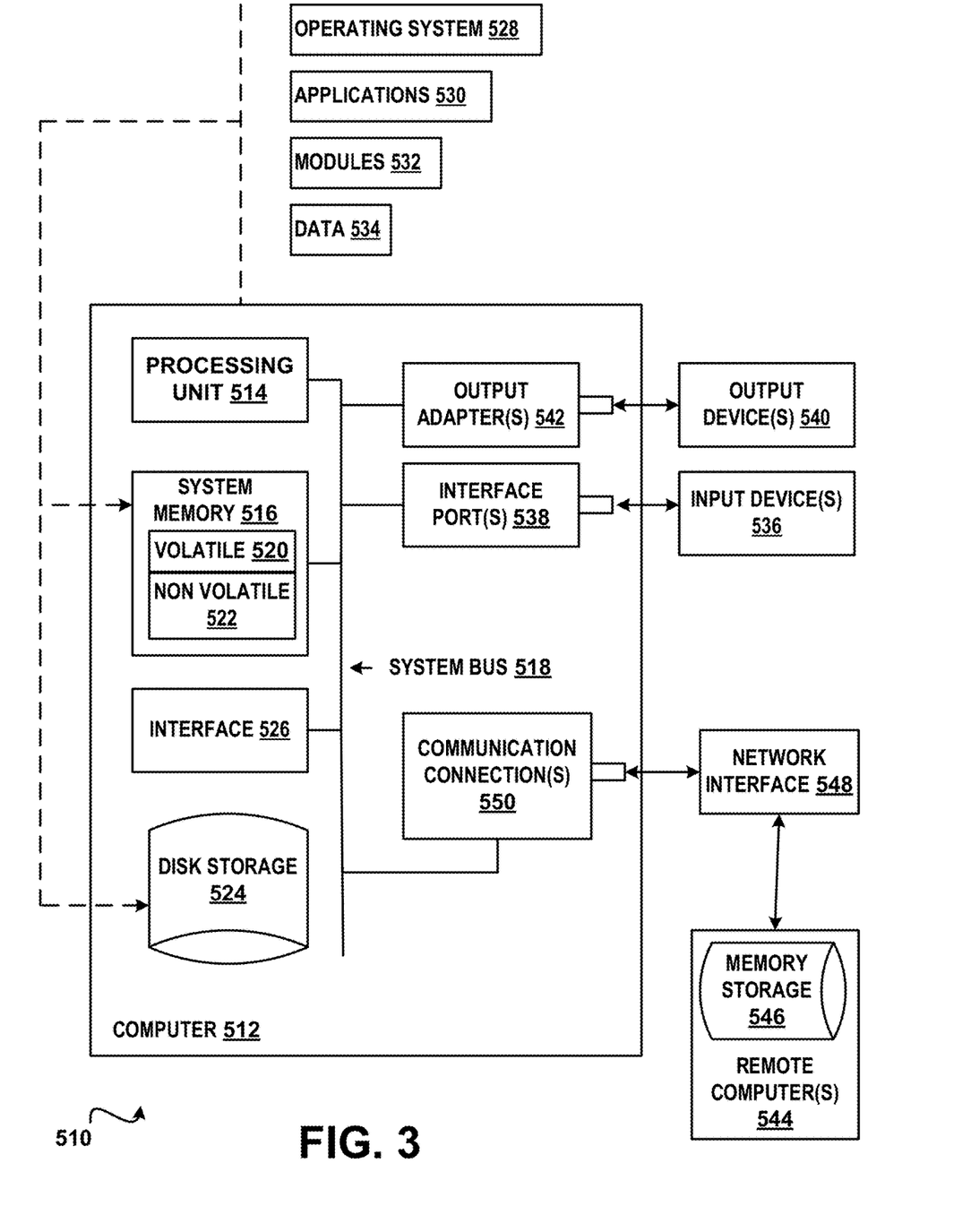
FIG. 3 is a block diagram of an example of a computing environment in accordance with aspects of the subject matter described herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-binary instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above.

Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include binary instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
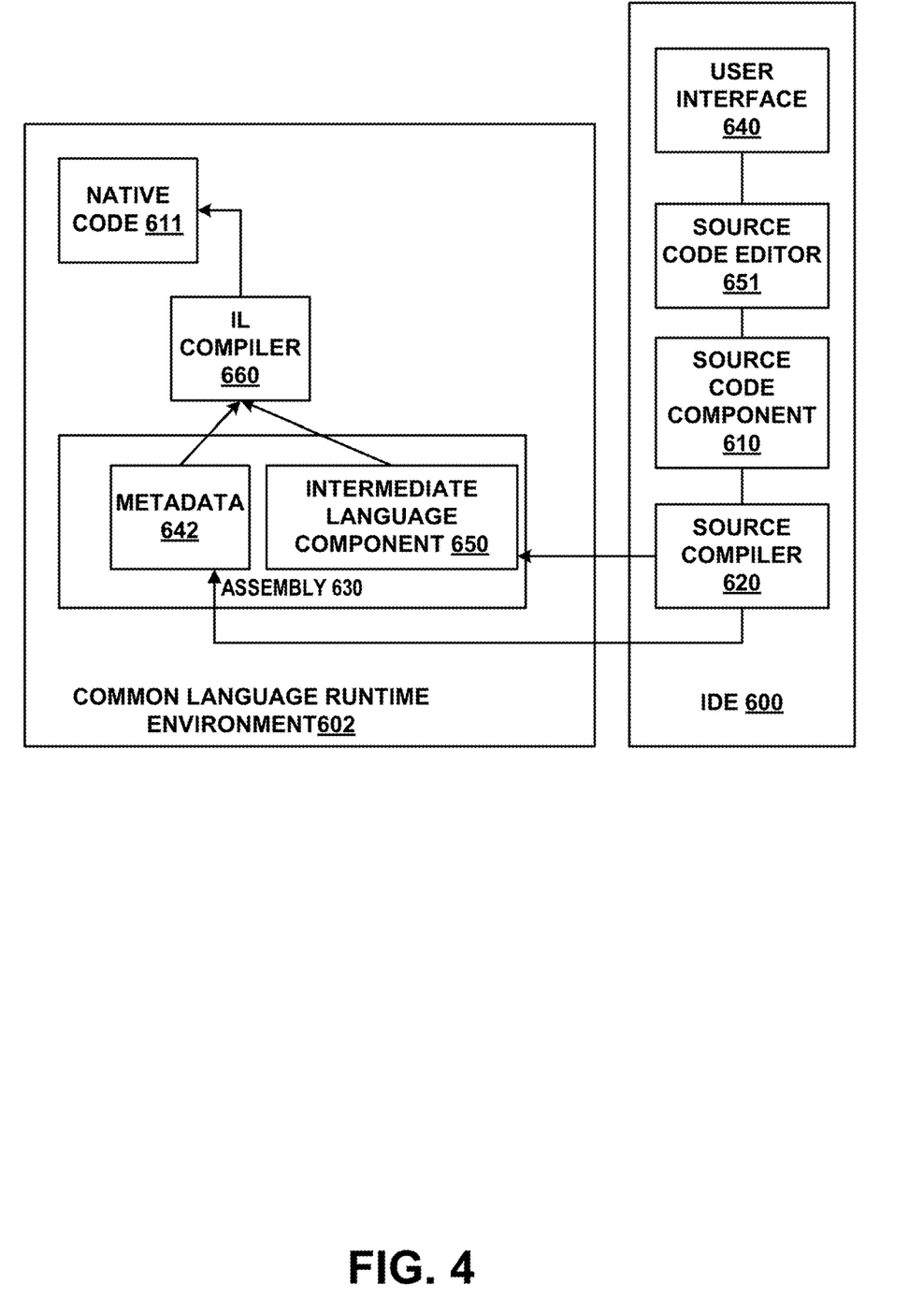
FIG. 4 is a block diagram of an example of an integrated development environment in accordance with aspects of the subject matter described herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++, C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine binary instructions) is created from the intermediate language component 650 using the intermediate language (IL) compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A system, comprising:
a memory; and
a processor connected to the memory, the processor configured to:
receive a threshold setting;
receive source code comprising a software change;

assess a risk factor of the software change using a model configured to evaluate tokenized portions of the source code to determine the risk factor of the software change, wherein the model has been trained using first feature vectors obtained from first tokenized source code with software bugs and second feature vectors obtained from second tokenized source code that does not have software bugs;

compare the risk factor of the software change with the threshold setting before committing, integrating, deploying or delivering the software change;

in response to determining that the risk factor falls below the threshold setting, commit, integrate, deploy, or deliver the software change;

in response to determining that the risk factor of the software change exceeds the threshold setting, block committing, integrating, deploying or delivering the software change;

responsive to user input from a particular individual, override the block of the committing, integrating, deploying, or delivering of the software change;

record information identifying the particular individual that provided the user input; and when the override results in an adverse result caused by committing, integrating, deploying, or delivering the software change, using the recorded information to prevent the particular individual from overriding a subsequent block of another software change.

2. The system of claim 1, wherein the processor is configured to:
in response to determining that the risk factor of the software change exceeds the threshold setting, block a commit of the software change.

3. The system of claim 1, wherein the processor is configured to:
in response to determining that the risk factor of the software change exceeds the threshold setting, block an integration of the software change.

4. The system of claim 1, wherein the processor is configured to:
in response to determining that the risk factor of the software change exceeds the threshold setting, block a delivery of the software change.

5. The system of claim 1, wherein the processor is configured to:
in response to determining that the risk factor of the software change does not exceed the threshold setting, perform a commit of the software change.

6. The system of claim 1, wherein the processor is configured to:
in response to determining that the risk factor of the software change does not exceed the threshold setting, perform an integration of the software change.

7. The system of claim 1, wherein the model is a recurrent neural network.

8. The system of claim 1, wherein the processor is further configured to train the model to determine the risk factor of the software change based on the following features:
a number of variables in the first tokenized source code with software bugs and the second tokenized source code that does not have software bugs,
a number of mathematical operations in the first tokenized source code with software bugs and the second tokenized source code that does not have software bugs,
particular referenced data types in the first tokenized source code with software bugs and the second tokenized source code that does not have software bugs,
numbers of loop constructs in the first tokenized source code with software bugs and the second tokenized source code that does not have software bugs,
usage of a particular method in the first tokenized source code with software bugs and the second tokenized source code that does not have software bugs, and
computational complexity of the first tokenized source code with software bugs and the second tokenized source code that does not have software bugs.

9. The system of claim 1, wherein:
the model is a long short-term memory recurrent neural network, and
the processor is further configured to train the long short-term memory recurrent neural network to determine the risk factor of the software change based on the following features:
a number of variables in the first tokenized source code with software bugs and the second tokenized source code that does not have software bugs,
a number of mathematical operations in the first tokenized source code with software bugs and the second tokenized source code that does not have software bugs,
particular referenced data types in the first tokenized source code with software bugs and the second tokenized source code that does not have software bugs,
numbers of loop constructs in the first tokenized source code with software bugs and the second tokenized source code that does not have software bugs,
usage of a particular method in the first tokenized source code with software bugs and the second tokenized source code that does not have software bugs, and
computational complexity of the first tokenized source code with software bugs and the second tokenized source code that does not have software bugs.

10. A method comprising:
receiving, by a processor, a threshold setting;
receiving source code comprising a software change;
assessing a risk factor for the software change using a model configured to evaluate tokenized portions of the source code to determine the risk factor of the software change, wherein the model has been trained using first feature vectors obtained from first tokenized source code with software bugs and second feature vectors obtained from second tokenized source code that does not have software bugs;
comparing the risk factor of the software change with the threshold setting before committing, integrating, deploying or delivering the software change;
in response to determining that the risk factor falls below the threshold setting, committing, integrating, deploying, or delivering the software change;
in response to determining that the risk factor of the software change exceeds the threshold setting, implementing a block of commitment, integration, deployment, or delivery of the software change;
responsive to user input from a particular individual, overriding the block of the commitment, integration, deployment, or delivery of the software change;
recording information identifying the particular individual that provided the user input; and
when the overriding of the block results in an adverse result caused by committing, integrating, deploying, or delivering the software change, using the recorded information to prevent the particular individual from overriding a subsequent block of another software change.

11. The method of claim 10, wherein the subsequent block relates to commitment, integration, deployment, or delivery of the another software change.

12. The method of claim 11, further comprising:
receiving approval by another individual to override the subsequent block; and
overriding the subsequent block responsive to receiving the approval.

13. The method of claim 10, further comprising:
training the model using the first feature vectors and the second feature vectors.

14. The method of claim 13, wherein the model is a neural network.

15. The method of claim 14, further comprising:
tokenizing the source code to obtain the tokenized portions.

16. A device comprising:
a memory; and
a processor, the processor configured to:
obtain source code comprising a software change;
determine a risk factor for the software change using a model configured to evaluate tokenized portions of the source code to determine the risk factor of the software change, wherein the model has been trained using first feature vectors obtained from first tokenized source code with software bugs and second feature vectors obtained from second tokenized source code that does not have software bugs;
based on the determined risk factor for the software change, generate a decision to block application of the software change;
responsive to approval received from a particular individual, override the block of the software change;
detect that the override of the block results in an adverse result caused by committing, integrating, deploying, or delivering the software change; and
responsive to detecting that the override results in the adverse result, prevent the particular individual from overriding a subsequent block of another software change.

17. The device of claim 16, wherein application of the software change comprises committing the software change to a software repository.

18. The device of claim 16, wherein application of the software change comprises integrating the software change into a software repository.

19. The device of claim 16, wherein application of the software change comprises delivering the software change to one of a test environment, production environment or manufacturing facility.

20. The device of claim 16, wherein the model comprises a neural network.

* * * * *